Patented Sept. 18, 1951

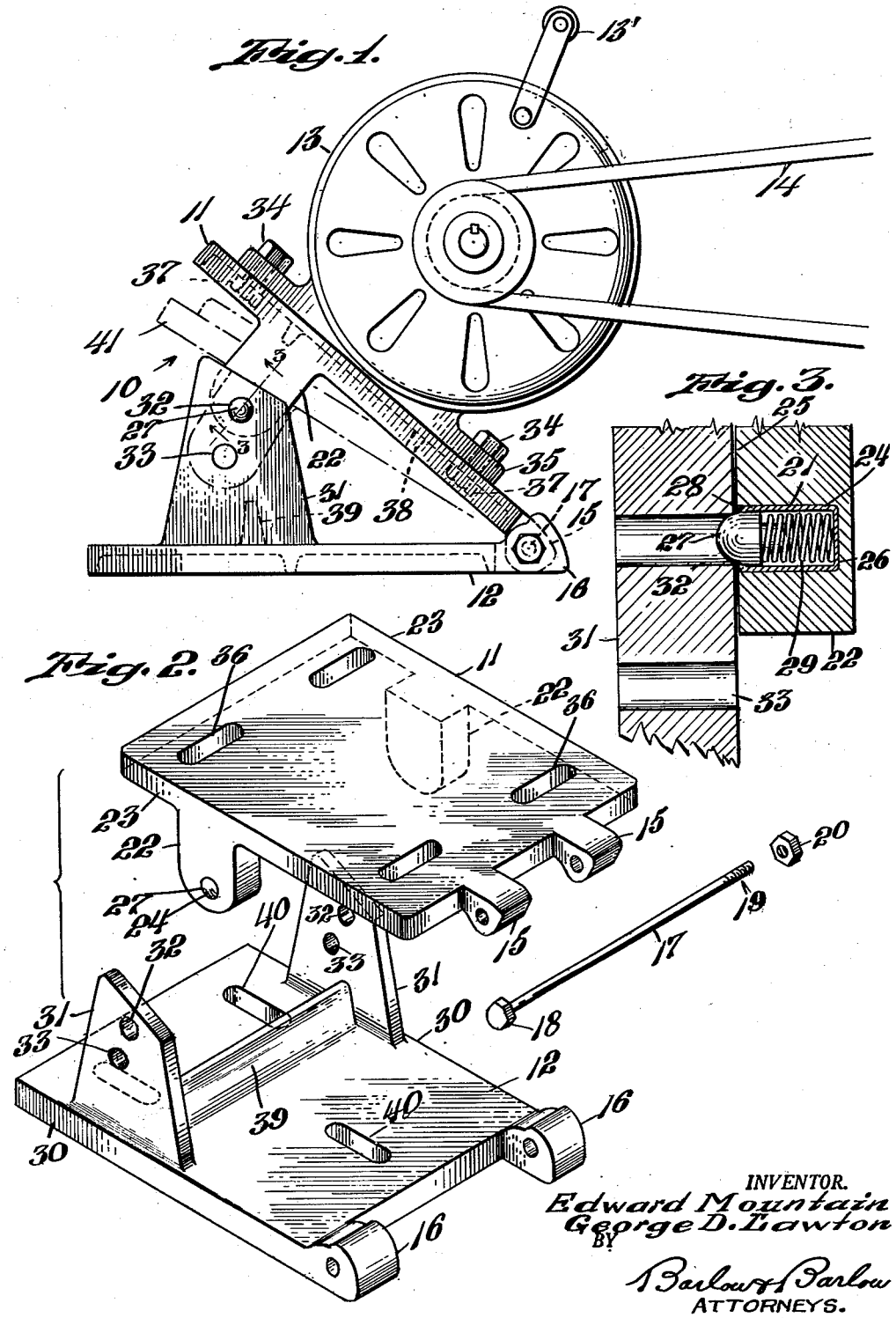

2,568,290

UNITED STATES PATENT OFFICE 2,568,290

MOTOR MOUNT

Edward Mountain and George D. Lawton,
Providence, R. I.

Application November 26, 1948, Serial No. 62,048

4 Claims. (Cl. 74—242.13)

This invention relates to improvements in a motor support, particularly an electric motor so that the belt drive transmission therefrom may be manually controlled to adjust the tension on the same.

A usual manner of mounting an electric motor consists in securing the motor to a platform or plate which is hingedly related to a base and movable opposite to the pull of the belt to tension the belt and retain it in the adjusted position by means of a threaded member or the like which extends through the plate into engagement with the base. It is usual in this type of construction that the pull of the belt will be in a direction to move the platform toward the base with the threaded member engaging the base to support the platform.

The general object of this invention is to improve the above-mentioned motor support by providing for more readily moving the platform to quickly adjust the tension of the belt drive.

A more specific object of the invention is to provide a motor mounting platform which may be resiliently held in a position to either maintain the belt tensioned or in a slack condition.

With these and other objects in view, the invention consists of certain novel features of construction, as will be more fully described and particularly pointed out in the appended claims.

In the accompanying drawings:

Figure 1 is a side elevational view of a motor support embodying our invention;

Figure 2 is an exploded view in perspective of the support shown in Figure 1; and Figure 3 is a sectional view taken substantially along line 3—3 of Figure 1.

In carrying out our invention, we provide a platform for attaching the motor thereto and hingedly relate this platform to a suitable base in a manner which enables the platform to be swung on an arc whereby the motor may be moved in the general direction of the pull of the belt thereon to slacken the same and relieve a driving relation with a machine operated thereby or in the opposite direction to tension the belt sufficiently to provide driving traction thereof. We provide for resiliently locking the platform to the base in either of the two chosen positions, which locking may be readily disengaged manually to move the platform from either position whereby to provide in effect a clutch arrangement between the machine and its driving motor so that the machine may be arrested without arresting the motion of the motor.

Referring to the drawings for a more detailed description of the invention, 10 designates generally a motor support comprising a platform 11 which is hingedly related to a base 12 and to which is fastened the motor 13. The platform 11 extends at an acute angle to the base and is movable on an arc about an axis at right angles to the plane of the belt 14 to slacken the same and in the opposite direction to tension the belt.

The platform 11 is provided with hinge lugs 15 at one end thereof which are spaced from each other and from the side edges of the platform. These lugs 15 extend in alignment between similar lugs 16 which project outwardly from one end of the base 12 and a hinge pin 17 having a head 18 and a threaded end portion 19 extends through the lugs 16—15 with the threaded end 19 engaged by a nut 20 to secure the pin 17 in place.

In order to provide for retaining the platform 11 in either the belt slackening or belt tensioning position, a resilient locking device designated generally 21 is provided (see Figure 3). There are two such devices 21 and these may be carried by the base 12 but preferably are attached to the platform 11 such as by means of oppositely disposed portions or ears 22 depending from the side edges 23 of the platform 11. Each ear has an opening 24 extending inwardly from the outer side 25 thereof. A cup 21 is received in each opening 24 and is frictionally retained in position by engagement with the walls of the opening. Each cup or device 21 comprises a hollow cylinder 26 which receives a plunger 27. The outer end 28 of the cylinder is flush with the side 25 and is peened inwardly so as to provide a restricted opening into the cylinder of a diameter slightly less than that of the plunger 27 thereby locking the plunger 27 within the cylinder 26. A compression spring 29 yieldingly urges the plunger 27 to move outwardly.

The base 12 is provided at the outer edges 30 with oppositely disposed upright arms 31, each of which is provided with openings 32 and 33. These openings are positioned to be in the path of movement of the plunger 27 which, when moved to register with an opening, will be received therein to lock the platform 11 in a selected position. To slacken the belt 14, the platform is moved upwardly to position the plunger 27 opposite the cavity 32, and to tension the belt, the platform is moved in a downward direction or towards the base 12 to position the plunger 27 in register with the opening 33, wherein the plunger 27 will be received to detachably lock the platform to the arms 31.

The motor 13 is adjustably fastened to the platform 11 such as by means of bolts 34 which extend through suitable openings in the foot 35 of the motor and through openings 36 in the platform 11 with the threaded portion of the bolt engaged by nuts 37 to tighten the same in a well-known manner. A handle 13' is secured to the motor for moving the platform in the selected position.

The platform 11 may be reenforced by means of a rib structure 38. The base 12 is likewise reenforced by means of a rib 39 extending between the arms 31. Openings 40 are provided for receiving fastening bolts (not shown) whereby to attach the base in position.

In the initial setting of the platform 11, as shown in full lines in Figure 1, the belt 14 will be in the slack position so that there will be no transmission of motion from the motor to the pulley (not shown) which may be driven by the belt 14. In order to tension the belt and provide a driving relation with the pulley (not shown) the platform 11 is manually moved to disengage the locking device 21 from engagement with the opening 32 and move the same to the position shown in dot and dash lines 41 which will position the plunger 27 in register with the opening 33 to be moved therein by the urge of the spring 29. In this latter position, tension will be placed upon the belt sufficiently to cause driving relation. To arrest the motion of the machine driven by the belt 14, the platform 11 is raised to the full line position shown in Figure 1 which will slacken the belt, as previously described.

It will now be apparent that we have disclosed a motor support which is of a simple construction which functions as a mount for the motor and also functions to place the belt 14 in and out of driving relation with a machine which may be driven by the motor.

We claim:

1. A mount for a motor comprising a base member having spaced upright arms at one end portion thereof, said base having openings therein for receiving fastening means to secure said base in position, a platform member having ears depending therefrom at one end portion thereof, a motor secured to said platform, a pulley carried by said motor, a driving belt trained over said pulley for transmitting motion from said motor to the work, said platform being hingedly mounted to said base at a location thereon to one side of the axis of said motor inwardly of the stretch of said belt for movement relative to said base whereby movement of said platform toward said base will tension said belt and movement outwardly from said base will loosen said belt out of driving relation with said pulley, said ears extending between said arms in close adjacency thereto, and resiliently actuated interlocking means carried by said arms and ears for detachably locking said ears and arms to each other, said interlocking means being moved out of locking engagement by a manual force applied to said platform whereby said platform may be quickly moved to position the motor and the belt carried thereby in and out of driving relation with the work.

2. A mount for a motor comprising a base member having spaced upright arms at one end portion thereof, said base having elongated openings therein for receiving fastening means to adjustably secure said base in position, a platform member having ears depending therefrom at one end portion thereof, a motor secured to said platform, a pulley carried by said motor, a driving belt trained over said pulley for transmitting motion from said motor to the work, said platform being hingedly mounted to said base at a location thereon to one side of the axis of said motor inwardly of the stretch of said belt for movement relative to said base whereby movement of said platform toward said base will tension said belt and movement outwardly from said base will loosen said belt out of driving relation with said pulley, said ears extending between said arms in close adjacency thereto, and resiliently actuated interlocking means carried by said arms and ears for detachably locking said ears and arms to each other, said interlocking means comprising a spring-pressed plunger carried by one of said members and engageable with the edges of an opening in the other member and retractable out of locking engagement by a manual force applied to said platform whereby said platform may be quickly moved to position the motor and the belt carried thereby in and out of driving relation with the work.

3. A mount for a motor comprising a base member having spaced upright arms at one end portion thereof provided with spaced openings therein, said base having elongated openings therein for receiving fastening means to adjustably secure said base in position, a platform member having ears depending therefrom at one end portion thereof, a motor secured to said platform, a pulley carried by said motor, a driving belt trained over said pulley for transmitting motion from said motor to the work, said platform being hingedly mounted to said base at a location thereon to one side of the axis of said motor inwardly of the stretch of said belt for movement relative to said base whereby movement of said platform toward said base will tension said belt and movement outwardly from said base will loosen said belt out of driving relation with said pulley, said ears extending between said arms in close adjacency thereto, and resiliently actuated means carried by said ears and movable therewith to be positioned in register with a selected one of said openings to be received therein for detachably locking said ears and arms to each other, said means being retractable out of locking engagement by a manual force applied to said platform whereby said platform may be quickly moved to position the motor and the belt carried thereby in and out of driving relation with the work.

4. A mount for a motor comprising a base having spaced upright arms at one end portion thereof provided with spaced openings therein, means carried by said base whereby the same may be adjustably secured in position, a platform having ears depending therefrom at one end portion thereof, a motor secured to said platform, a pulley carried by said motor, a driving belt trained over said pulley for transmitting motion from said motor to the work, said platform being hingedly mounted to said base at a location thereon to one side of the axis of said motor inwardly of the stretch of said belt for movement relative to said base whereby movement of said platform toward said base will tension said belt and movement outwardly from said base will loosen said belt out of driving relation with said pulley, said ears extending between said arms in close adjacency thereto, a spring-loaded plunger carried by each of said ears and movable therewith to be positioned in register with a selected one of said openings to be received therein for detachably locking said platform to said arms, said plunger being retractable out of locking engagement by a manual force applied to said platform whereby said platform may be quickly moved to position the motor and the belt carried thereby in and out of driving relation with the work.

EDWARD MOUNTAIN.
GEORGE D. LAWTON.

REFERENCES CITED

The following references are of record in the file of this patent:

UNITED STATES PATENTS

| Number | Name | Date |
|---|---|---|
| 1,049,984 | Bowers | Jan. 7, 1913 |
| 2,041,578 | Tautz | May 19, 1936 |
| 2,167,793 | Barger | Aug. 1, 1939 |
| 2,213,434 | Rayniak | Sept. 3, 1940 |
| 2,235,972 | Zimmerman | Mar. 25, 1941 |
| 2,255,908 | Anderson | Sept. 16, 1941 |